Dec. 25, 1951 R. L. LEVY 2,579,840
HYDRAULIC STEERING MECHANISM FOR AIRPLANES
Filed Oct. 28, 1947
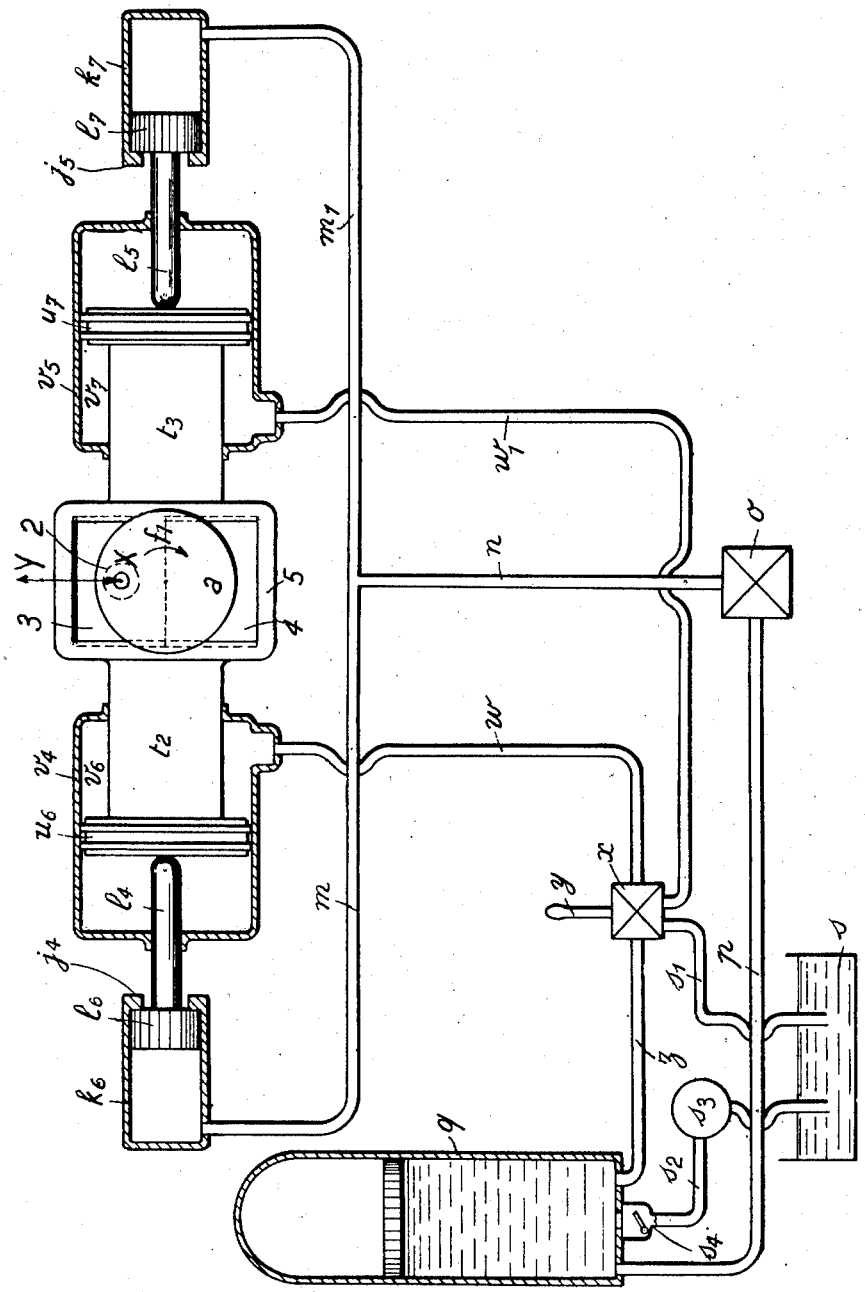
Inventor
R. L. Levy Patented Dec. 25, 1951

2,579,840

UNITED STATES PATENT OFFICE 2,579,840

HYDRAULIC STEERING MECHANISM FOR AIRPLANES

René Lucien Levy, Paris, France, assignor to Societe d'Inventions Aeronautiques et Mecaniques S. I. A. M., Geneva, Switzerland, a corporation of Switzerland Application October 28, 1947, Serial No. 782,617
In France November 5, 1942

3 Claims. (Cl. 244—50)

The invention refers to steering mechanisms of vehicles and more particularly to hydraulic steering mechanisms of airplanes.

According to the main feature of the present invention, a steering member, such as a rudder, a steerable tail wheel or the nose wheel of a tricycle landing gear is subjected to a hydraulic force tending constantly to bring it back in its median or neutral position. Under such conditions, the median or neutral position of the steering member is a stable position, that is, this member remains in this position as long as the pilot does not operate the manual control provided for its displacement. Furthermore after it is displaced from this median or neutral position in either direction by the pilot to effect a steering operation, the steering member tends to return automatically to neutral position as soon as the pilot frees the steering control member.

According to another feature of the invention, the intensity of this hydraulic return force may be adjusted at will. Thus, for instance, in the case of the tail wheel of an airplane, or of the nose wheel of a tricycle landing gear, it becomes possible to adjust the relative amount of freedom left to this wheel with respect to its steering displacements and thereby to ensure the optimum behaviour of said wheel on the ground during taxiing operations.

According to a further feature of the invention, this hydraulic return force is advantageously produced by an oleo-pneumatic accumulator of relatively large capacity so as to effect a return action of substantially constant intensity, which constitutes an important advantage with respect to the known return devices of the spring type, which offer a variable resistance to the angular displacement of the steering member increasing with the amplitude of this displacement away from the median or neutral position.

In certain applications of the present invention it is necessary that the steering member be capable of castering 180° about its pivot on either side of its median or neutral position. This condition must be taken into account in the case of application of the invention to tail wheels or nose wheels of tricycle landing gears of airplanes in order to facilitate the manoeuver of the aircraft on the airport and in the hangars.

It is also an object of the present invention to provide a steering mechanism capable of fulfilling this condition. Thus full-castering mechanism may be associated with any type of steering mechanism, independently of the provision of the above-mentioned device for the automatic return of the steering member. For instance, it may be applied to mechanically, pneumatically or electrically controlled steering mechanisms and/or automatic return devices of the above-mentioned type.

Essentially, in a preferred form of the present invention, this latter consists in connecting the steering member through the intermediary of a transmission device of the eccentric type allowing for its full or 180° castering about its pivot on either side of its median or neutral position, without interfering with the controlled steering and/or automatic return operations.

Obviously the present invention may be applied, not only to a compound system of steering control and of automatic return of a steering member, but also to any system of steering control or of automatic return of castering members and is not to be limited solely to application in the field of aeronautics.

Other objects, features and advantages of the present invention will appear in the following description, made in reference to the accompanying drawings, in which:

The figure is a diagrammatic view of a preferred embodiment of the invention.

Referring to the drawing, the steering member $a$ which is to be controlled and returned to a neutral position can constitute the spindle of a steerable wheel such as embodied in the conventional tail wheels or the nose wheels of landing gear for aircraft. The median or neutral position of this spindle is denoted at $x$—$y$.

An eccentric crank pin 2 is carried by the steering member or spindle $a$ and this pin is pivotally mounted in a block 3 which in turn is slidably mounted in the rectangular guide opening 4 of a frame or cage 5. As indicated, the opposite sides of the frame or cage are integral with rods $t_2$ and $t_3$ respectively constituting the rods or shanks of operating pistons $u_6$ and $u_7$. These pistons are slidably mounted in symmetrically disposed cylinders $v_4$ and $v_5$ which respectively are on opposite sides of the line defining the median or neutral position of the spindle $a$. The pistons divide the cylinders $v_4$ and $v_5$ into two chambers constituting inner chambers adjacent the frame or cage 5 and outer chambers between the outer faces of the pistons $u_6$ and $u_7$ and the end walls of the cylinders.

Outwardly of the cylinders $v_4$ and $v_5$ are secondary cylinders $k_6$ and $k_7$ respectively coaxially aligned with the operating cylinders and provided with inturned annular shoulders $j_4$ and $j_5$ at the inner ends thereof which partially close these secondary cylinders. Slidably mounted within these secondary cylinders are secondary pistons constituting automatic return pistons $l_6$ and $l_7$ respectively embodying fingers or rods $l_4$ and $l_5$ which in turn are in cooperative contact with the respective outer faces of the main or operating pistons $u_6$ and $u_7$. As is apparent, the annular shoulders $j_4$ and $j_5$ limit the stroke of pistons $l_6$ and $l_7$ toward the spindle $a$.

Inasmuch as the operating pistons $t_2$ and $t_3$ are in alignment with the automatic return pistons $l_6$ and $l_7$ and the operating pistons are through the eccentric pin $2$ coupled with the spindle $a$ the latter may be displaced through an arc of $\pm 180°$ through the median or neutral position $x-y$ and on opposite sides thereof. This displacement of the spindle is responsive to the rectilinear displacement of the operating pistons $u_6$ and $u_7$ and also to the rectilinear displacement of the secondary or automatic return pistons $l_6$ and $l_7$.

The operating and returning pressure is fluid pressure furnished by an oleo-pneumatic accumulator $q$ of large capacity and suitable fluid circuits which include the conduits $z$, $w$ and $w_1$, the latter connected respectively with cylinders $v_4$ and $v_5$ and conduits $p$, $n$, $m$ and $m_1$, the latter connected respectively with the cylinders $k_6$ and $k_7$. The flow of fluid from the accumulator to and from the operating cylinders is controlled by a manually operable selector valve or distributor $x$ of a known type including an operating handle $y$. This valve is connected with the conduits $w$ and $w_1$, the main conduit leading from the accumulator $z$ and a return conduit $s_1$ in such fashion that by suitable manipulation of the handle $y$ in either direction fluid under pressure can flow from the accumulator through conduit $w_1$ into cylinder $v_5$ and whereupon return fluid flows from cylinder $v_4$ through conduit $w$, distributor $x$ and conduit $s_1$, or upon reverse movement of the handle the fluid will flow into conduit $w$ and cylinder $v_4$ and out of cylinder $v_5$ through conduit $w_1$, the distributor and conduit $s_1$. In the position illustrated the fluid from the accumulator $q$ does not pass through the distributor and the conduits $w$ and $w_1$ are in circuit with one another.

The fluid supply to the secondary cylinders includes the conduit $p$ and an adjustable pressure reducer $o$ mounted between conduits $p$ and $n$. A tank $s$ receives the return flow through the conduit $s_1$ and a conduit $s_2$ extends between the tank and the accumulator. In this latter conduit is interposed a pump $s_3$ and between the pump and accumulator $q$ is a check valve $s_4$, the pump functioning to recharge and maintain the pressure in the accumulator.

As previously indicated, with the hand lever $y$ in neutral position as shown the conduits $w$ and $w_1$ are connected and the spindle $a$ occupies its median or neutral position $x-y$.

Upon any tendency of the spindle $a$ to move out of its neutral position, for instance in the direction of the arrow $f_1$, the torque generated by the spindle would tend to move the rod $t_3$ and piston $u_7$ to the right and through contact of the outer face of the piston $u_7$ with the rod or finger $l_5$ the piston $l_7$ would likewise have a tendency to move to the right. The fluid flows through conduit $n$ and the pressure reducer $o$ toward the accumulator $q$. However, the pressure existing in this accumulator opposes the return fluid flow and imparts a resilient return action to the piston $l_7$ to restore and maintain through contact of the plunger or finger $l_5$ with piston $u_7$ the spindle $a$ at its neutral position. At the same time the fluid expelled from cylinder $v_4$ passes through conduit $w$, the distributor $x$ and conduit $w_1$ into cylinder $v_5$. The adjustable pressure reducer $o$, however, can be so adjusted as to provide that the pistons $l_6$ and $l_7$ lock the spindle in the median or neutral position under normal disturbing torques so that the pistons $u_6$ and $u_7$ are unable to move except and unless direct fluid pressure from the accumulator is exerted thereon.

Thus, in order to submit the spindle $a$ to steering action so as to make the same turn in the direction of the arrow $f_1$ the handle $y$ is moved to place the fluid under pressure in conduit $z$ in communication with the conduit $w_1$ and thence into operating cylinder $v_5$ and simultaneously the conduit $w$ is placed in communication through the distributor with conduits $s_1$ and thus the tank. Under these circumstances the pistons $u_7$ and $u_6$ will respectively move to the right, thereby imparting a turning action to spindle $a$ and the fluid expelled by piston $l_7$ from cylinder $k_7$ returned through the pressure reducer $o$ so that the steering action can be effected.

The pump $s_3$ as indicated recharges the accumulator $f$.

When the handle $y$ resumes its neutral position following steering action to the right the pressure in the accumulator then permits recharging of cylinder $k_7$ to restore the spindle $a$ to its median position, the excess fluid from pressure chamber $v_7$ in cylinder $v_5$ flowing through conduits $w_1$ and $w$ into pressure chamber $v_6$ of cylinder $v_4$.

It is therefore clear that upon movement of handle $y$ in the opposite direction pressure fluid flows into pressure chamber $v_6$ through conduit $w$ to move piston $u_6$ to the left with the fluid expelled from chamber $k_6$ passing through conduits $m$ and $n$ and the excess fluid from pressure cylinder $v_7$ flowing through distributor $s$ and conduit $s_1$ into the tank. Likewise, in this instance when the handle resumes its neutral position the accumulator pressure operating through conduits $m$ and $n$ and entering cylinder $k_6$ restores the spindle to its median or neutral position.

It is therefore clear that as applied to steering wheels for airplanes the present invention facilitates steering control, restores the steering wheel automatically back to its median or neutral position and renders it possible to lock this steering wheel during take-off and landing.

What is claimed is:

1. Hydraulic steering mechanism more particularly for aircraft landing gear comprising a rotatable spindle movable through an arc of $\pm 180°$ from opposite sides of a neutral position, an eccentric member on said spindle, a pair of primary hydraulic cylinders mounted in spaced relation to and on opposite sides of said spindle, an operating piston in each cylinder defining a variable volume pressure chamber therein, means connecting the pistons to said eccentric member so that rectilinear movement of the pistons imparts rotary movement to the spindle, a secondary hydraulic cylinder mounted in spaced relation to and in alignment with each of the primary cylinders, a secondary piston in each secondary cylinder, rods on each secondary piston movable within the respective primary cylinders and contacting the outer faces of the operating pistons therein, an oleo-pneumatic accumulator, a tank, a four-way distributor and conduit means connecting said distributor respectively with said accumulator and tank and to the pressure chambers of the operating cylinders, conduit means interconnecting said secondary cylinders, an adjustable pressure reducer in communication with said last mentioned conduit means, and conduit means connecting said pressure reducer in communication with said accumulator.

2. Hydraulic steering mechanism more particularly for aircraft landing gear comprising a rotatable spindle movable through an arc of ±180° from opposite sides of a neutral position, a guiding frame, a block slidably mounted within said frame, an eccentric crank pin pivotally mounted in said block and carried by said spindle, a pair of operating pistons integral with said frame and extending from opposite sides thereof, a pair of primary hydraulic cylinders mounted in spaced relation with respect to and on opposite sides of said spindle and receiving said pistons, said pistons defining variable volume pressure chambers within said cylinders, a pair of fingers each in cooperative contact with the outer face of one of said pistons and slidable through said cylinders, return pistons carrying said fingers and a pair of secondary hydraulic cylinders receiving said return pistons, an oleo-pneumatic accumulator, a tank, a controllable four-way distributor, conduits connecting said distributor respectively to said accumulator and tank and to the pressure chambers in the respective primary cylinders, conduit means interconnecting said secondary hydraulic cylinders, an adjustable pressure reducer connected to said last mentioned conduit means and conduit means connecting the pressure reducer to the accumulator, said distributor in normal condition blocking flow from said accumulator to said pressure chambers so that fluid pressure from said accumulator through the pressure reducer and into said secondary cylinders maintains said spindle in a median position but upon controlling said distributor to permit fluid flow selectively into either said pressure chambers rectilinear movement of said operating pistons imparts rotatable steering movement to said spindle.

3. Hydraulic steering mechanism as defined in and by claim 2 including conduit means providing a connection between said accumulator and said tank, a recharging pump connected to said conduit means and a check valve in said conduit means and between the pump and the accumulator.

RENÉ LUCIEN LEVY.

REFERENCES CITED

The following references are of record in the file of this patent:

UNITED STATES PATENTS

| Number | Name | Date |
| --- | --- | --- |
| 1,251,563 | O'Donnell | Jan. 1, 1918 |
| 2,254,935 | Darling | Sept. 2, 1941 |
| 2,401,364 | Mercier | June 4, 1946 |

FOREIGN PATENTS

| Number | Country | Date |
| --- | --- | --- |
| 851,580 | France | Oct. 2, 1939 |